United States Patent [19]
Tolman et al.

[11] Patent Number: 6,152,121
[45] Date of Patent: Nov. 28, 2000

[54] OXYGENATED GEL FOR IMPROVING PERFORMANCE OF COMBUSTION ENGINES THROUGH IMPROVED BURNING OF COMBUSTIBLES

[76] Inventors: Marriner Tolman, 9756 S. 520 East, Sandy, Utah 84070; Alan Taylor, 1259 N. 625 East, Orem, Utah 84057

[21] Appl. No.: 09/318,491

[22] Filed: May 25, 1999

[51] Int. Cl.$^7$ .................................................. F02M 23/04
[52] U.S. Cl. ........................................... 123/585; 123/1 A
[58] Field of Search .................................... 123/588, 585, 123/567, 1 A, 690

[56] References Cited

U.S. PATENT DOCUMENTS

| | | | |
|---|---|---|---|
| 3,877,450 | 4/1975 | Meeks | 123/567 |
| 3,961,609 | 6/1976 | Gerry | 123/567 |
| 5,235,936 | 8/1993 | Kracklauer | 123/1 A |
| 5,584,265 | 12/1996 | Rao et al. | 123/1 A |
| 5,678,526 | 10/1997 | Cullen et al. | 123/690 |

*Primary Examiner*—Willis R. Wolfe
*Assistant Examiner*—Hyder Ali
*Attorney, Agent, or Firm*—Morriss, Bateman, O'Bryant & Compagni

[57] ABSTRACT

A system and method for improving performance and fuel efficiency of a combustion engine by providing an oxygen enriched gel which is inserted near an air intake, where the gel is stored within a container formed from a gas permeable membrane which is sufficiently porous so as to enable the gel to gradually evaporate. The evaporating gel releases oxygen, which is drawn into the air intake, resulting in reduced emissions and improved performance of the engine. No modifications to the combustion engine are required to use the system. The gel is inexpensive, and the gel container is preferably replaced or refilled approximately as often as an oil change is performed.

33 Claims, 4 Drawing Sheets

OXYGENATED GEL FOR IMPROVING PERFORMANCE OF COMBUSTION ENGINES THROUGH IMPROVED BURNING OF COMBUSTIBLES

BACKGROUND

1. The Field Of The Invention.

This invention relates generally to improving performance of a combustible engine while reducing harmful emissions. More specifically, the invention relates to an advantageous method of providing oxygen enriched air in the intake of the combustible engine, and for providing a convenient method for replacement of an oxygen supplying system during routine car maintenance, where the system does not require a retrofit of an existing engine.

2. The State Of The Art

There are various methods and apparatus that have been developed for providing oxygen to a combustion engine. Generally, oxygen enriched air supplies are fed to combustion engines in an attempt to control pollution. Increased amounts of oxygen enables hydrocarbons to be burned more thoroughly in a combustion engine, thus decreasing their presence in emissions. The overall effect is to reduce particulates, visible smoke, and nitrous oxides.

While some of the benefits of introducing oxygen enriched air into a combustion engine are apparent, the methods and apparatuses devised to achieve this goal vary greatly. For example, in U.S. Pat. No. 5,649,517, issued to Poola et al., the patent teaches a modified combustion engine. The combustion engine is modified by enabling it to selectively supply at least a portion of oxygen enriched air to an air intake of a combustion engine that is equipped with an air separation membrane device. Air is at least partially diverted from an air intake filter to the air separation membrane. The permeable membrane device separates a portion of the nitrogen in the ambient air so that oxygen enriched air is generated. The oxygen enriched air is supplied to a mixing chamber, along with ambient air, and then supplied to the intake of the engine. It should be apparent that substantial structure must be added to the combustion engine in order to supply the oxygen enriched air using this system. The system is so large that it is likely it would be difficult to retrofit existing combustion engines. It should also be noted that the system includes new valves, sensors, air flow piping, and a control system for selectively directing oxygen and nitrogen.

In U.S. Pat. No. 5,678,526, issued to Cullen et al., the patent teaches a polymeric oxygen enrichment device having a membrane exposed to engine vacuum on one side, and to ambient air on the other side, to thereby provide oxygen enriched air to the intake of a combustion engine. The system includes a valve, a blower, and a controller for operation of the valve and an air/fuel ratio, and for determining a desired air/fuel ratio. This system likewise is probably difficult to install as a retrofit in an existing combustion engine.

An alternative approach to the problem of how to provide oxygen enriched air to a combustion engine is taught in U.S. Pat. Nos. 3,877,450 (Meeks) and 4,681,071 (Smith). Both of these patents teach installation of an oxygen tank whose output is regulated as is it fed to the air intake of a combustion engine. This design has significant drawbacks such as the added weight of the oxygen tank, the refilling or replacement of the tank after it is empty, the dangers of the tank itself, and the space that must be found within an engine compartment.

A variation on the invention taught in Meeks and Smith is taught in U.S. Pat. No. 3,961,609 issued to Gerry. This system teaches a tank wherein oxygen is generated through a thermal and chemical process, or by electrolytic decomposition of water. A storage tank is also provided for storing oxygen that is generated. This system is probably more complicated than Meeks or Smith because of the logistics of replacement of reactants.

Other systems include one for introducing an oxidizer into a combustion chamber to thereby reduce emissions of noxious components in the exhaust gases (U.S. Pat. No. 5,647,304) and adjusting the air-fuel ratio in a widened lean burn range of engine operating conditions to thereby reduce emissions (U.S. Pat. No. 5,765,372).

What is needed is a way to reduce emissions of nitrogen oxides from a combustion engine which does not require modification to an existing combustion engine or engine compartment. The system should enable any combustion engine to not only reduce emissions, but also to increase fuel efficiency and increase power output thereof. The system should also be easy to install and replace.

OBJECTS AND SUMMARY OF THE INVENTION

It is an object of the present invention to provide a method and apparatus for reducing emissions in the exhaust of a combustion engine.

It is another object to provide a method and apparatus for improving engine performance including fuel efficiency in the combustion engine.

It is another object to provide a method and apparatus for reducing emissions and improving engine performance of the combustion engine which does not require modifications to be made to the combustion engine or to the engine compartment.

It is another object to provide a method and apparatus for reducing emissions and improving engine performance of the combustion engine which is easily replaceable and can be accomplished during normal car maintenance.

It is another object to provide a method and apparatus for reducing emissions and improving engine performance of the combustion engine which is able to provide these benefits for a substantial number of miles before requiring replacement.

It is another object to provide a method and apparatus for reducing emissions and improving engine performance of the combustion engine which is inexpensive to manufacture and replace when exhausted.

It is another object to provide a method and apparatus for reducing emissions and improving engine performance of the combustion engine which is non-toxic.

It is another object to provide a method and apparatus for reducing emissions and improving engine performance of the combustion engine which can be modified to operate in ambient air temperatures that are above freezing but below room temperature.

It is another object to provide a method and apparatus for reducing emissions and improving engine performance of the combustion engine which is relatively easy to manufacture.

It is another object to provide a method and apparatus for reducing emissions and improving engine performance of the combustion engine which can be modified for use in various engine configurations, and specifically, various shapes of intake manifolds.

The present invention is a system and method for improving performance and fuel efficiency of a combustion engine by providing an oxygen enriched gel which is inserted near an air intake, where the gel is stored within a container formed from a gas permeable membrane which is sufficiently porous so as to enable the gel to gradually evaporate. The evaporating gel releases oxygen, which is drawn into the air intake, resulting in reduced emissions and improved performance of the engine. No modifications to the combustion engine are required to use the system. The gel is inexpensive, and the gel container is preferably replaced or refilled approximately as often as an oil change is performed.

In a first aspect of the invention, the gel is oxygenated before being placed in the container. The oxygenation process is simple and inexpensive.

In a second aspect of the invention, the container is preferably comprised of a plastic. The plastic is relatively porous. To improve evaporation of the oxygenated gel, holes can be made in the plastic using a pin.

In a third aspect of the invention, the gel is a non-toxic material which is safe to touch.

In a fourth aspect of the invention, the container can be removed, refilled with oxygenation gel, and reinserted into near the combustion engine. Replenishment of the gel is typically a part of normal vehicle maintenance, like changing oil.

In another aspect of the invention, a heating system can be used to make sure that evaporation of the gel is relatively constant when the engine is running, regardless of the environmental conditions such as temperature and humidity.

In another aspect of the invention, exhaust gases or air warmed by a radiator can be routed so as to warm the air filter where the gel is stored.

These and other objects, features, advantages and alternative aspects of the present invention will become apparent to those skilled in the art from a consideration of the following detailed description taken in combination with the accompanying drawings.

BRIEF DESCRIPTION OF THE DRAWINGS

FIG. 1 shows an engine which could be found in the prior art, and which can include the oxygenation system of the presently preferred embodiment.

DETAILED DESCRIPTION OF THE INVENTION

Figure 1:
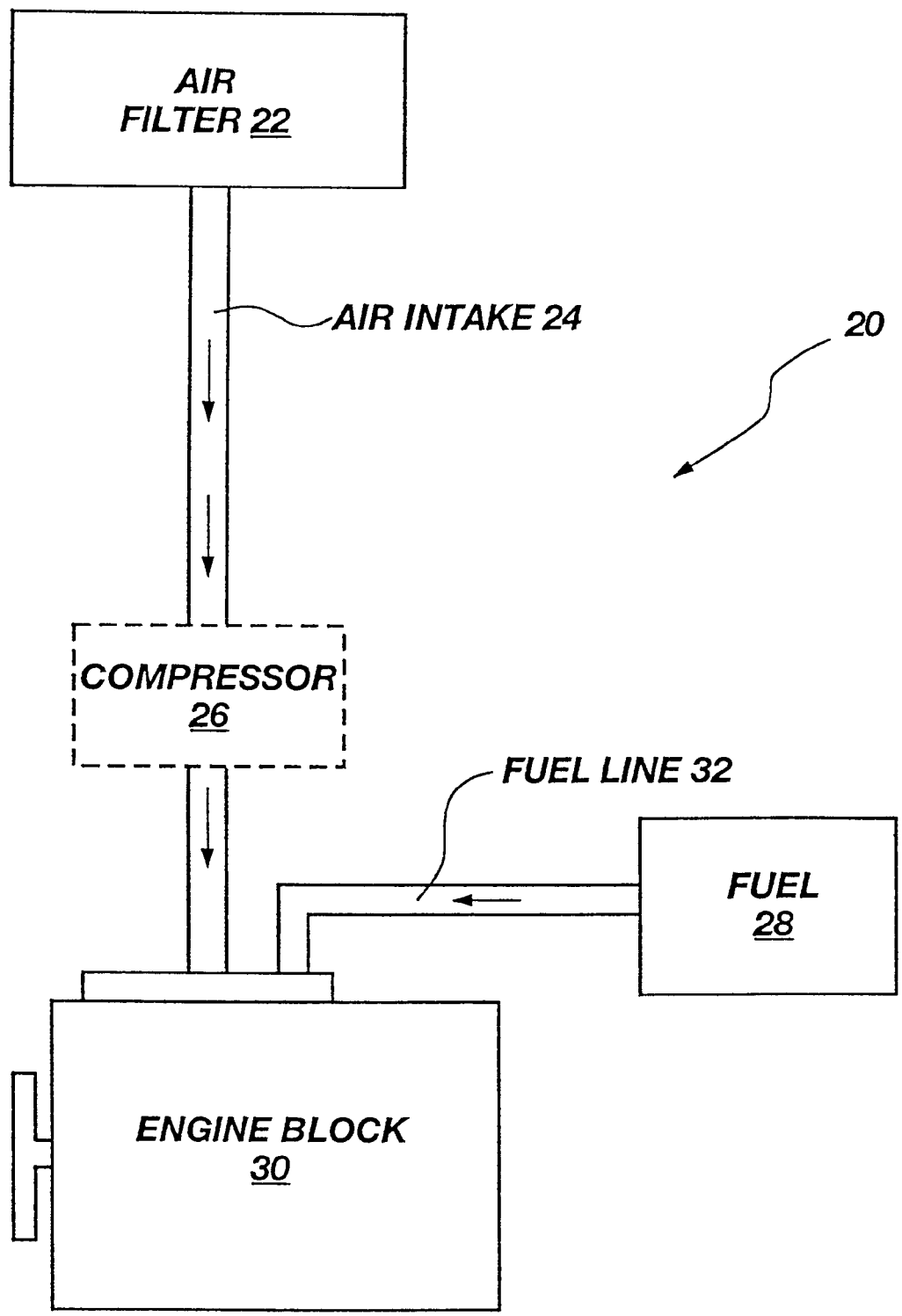
FIG. 1 is a block diagram of some of the components and the air flow between the components of a combustion engine.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The presently preferred embodiment of the present invention is a system for providing oxygen to a vehicle engine. The system includes an oxygenated gel which is placed in a gas permeable bag or porous membrane (porous to gases) which enables the gel to evaporate, thereby releasing oxygen into an air intake of a vehicle. As will be explained, one of the main advantages of this system for providing oxygen to a vehicle engine is that it is inexpensive and does not require retrofitting of an existing vehicle.

Beginning with the gel, there are certain desirable characteristics or properties which it must possess in order to function properly in the present invention. A first characteristic is that the gel must be able to retain oxygen or air while in the gel state. Retention is important because evaporation is the release mechanism for the oxygen. In other words, as the liquid evaporates from the gel, oxygen in the gel is released into the surrounding environment.

Advantageously, evaporation occurs at a relatively constant rate from the gel. of course, the simplicity of the oxygen delivery mechanism also means that evaporation is occurring even when the vehicle is not in use.

Nevertheless, the rate of evaporation is relatively slow, such that even though a vehicle is not in constant, enough of the oxygen is released during actual operating of the engine to benefit the combustion process. Evaporation can take as long as it takes a vehicle, which is driven normally, to travel approximately 3000 miles over a two to three month period. In other words, evaporation can coincide with the recommended travel distance between oil changes, regardless of the amount of use of the vehicle during that time because evaporation will typically occur at all times under the correct environmental conditions.

It should be recognized, however, that there are many factors which can influence the rate of evaporation. For example, evaporation is going to occur at a relatively faster rate when the gel is warm compared to when it is cold. Therefore, the temperature of the vehicle's engine, or at least the amount of heat that transfers to the gel from the engine, will influence the effectiveness of the system. The amount of heat transferred to the gel will depend upon the shape of the container, and where it is placed relative to the engine, as will be explained later.

It is also a patentable aspect of the invention that it might be desirable to adjust the rate of evaporation to thereby influence the rate of oxygen delivery to the engine. The rate of evaporation can be altered through the use of containers which are characterized by different levels of porousness. The rate of evaporation can even be adjusted through the creation of very small holes, such as those that can be made by a small and sharp object like a pin.

Regarding the gel itself, the presently preferred embodiment utilizes polyacrylamide or PAM because this substance has the desired characteristics. The applications of PAM include, for example, the enhancement of soil structure. Traditionally used for furrow irrigation systems, it is an organic compound synthesized from natural gas that reduces erosion, increases water infiltration rates, and optimizes wetting. In other words, PAM retains moisture so that it can be distributed to the soil over a period of time, thereby inhibiting drying. This characteristic of moisture retention makes PAM a desirable material for the gel. In fact, PAM can typically retain 400% of its weight in water. PAM has found application in such moisture retention applications as diapers. However, it should be apparent that other materials can be used for the gel. What is important is that the materials be able to retain water because it is the water in the gel which retains the oxygen.

The present invention oxygenates the gel so that evaporation can release the oxygen into an air intake of the engine. Oxygenating the gel can be done by any appropriate method known to those skilled in the art. The inventors place the gel in a container with a tube extending into the gel. A device for diffusing a gas into the gel is placed on the end of the tube that is inserted into the gel. For example, an "air stone" such as is commonly used in aquariums can be coupled to the tube. In the preferred embodiment, an oxygen tank is coupled to the opposite end of the tube. A pressure valve on the oxygen tank is opened to allow the oxygen to pass through the tube and into the air stone. The oxygen permeates the gel through the many openings in the air stone.

It is contemplated that a system for capturing the oxygen that is not diffused into the gel can be utilized in order to save resources and lower production costs.

The gel is initially prepared in an unoxygenated state. However, the oxygenation process begins by starting the oxygenation of the water that is to be added to the mixture that forms the gel. In the presently preferred embodiment, it is recommended that the oxygenation of the water begin approximately fifteen minutes before the polyacrylamide is added. Approximately 6 gallons of water is placed into the container. An oxygen line coupled to an air stone is placed in the container. After fifteen minutes, approximately 1 cup of polyacrylamide is placed into a container. The solution is mixed together, and the oxygenation of the resulting gel continues for approximately two hours. It has been determined that after two hours, the gel is sufficiently saturated with oxygen. When oxygenating the gel, a pressure valve on an oxygen tank is opened so that oxygen is released at the rate of approximately two liters per minute.

Obviously, the quantities and rates expressed above can be modified in order to oxygenate larger or smaller quantities of gel at slower or faster rates. The quantities provided above are only provided as an example of the oxygenation process. Experimentation is useful for determining the correct rate of oxygen release into the gel for a given amount of time and for a given quantity of gel.

Once the gel has been oxygenated, it should immediately be placed into storage/delivery containers. In the presently preferred embodiment, the container is a porous membrane (porous or permeable to gases) such as an ordinary plastic bag used for storing perishable products.

Any type of bag can be used which enables the gel to evaporate at a rate which is sufficient to provide some benefit to the engine. The presently preferred rate is one which allows the gel to evaporate in a time period of approximately two to three months for approximately 20 ounces of gel. As mentioned, it has been observed that it is possible to adjust the rate of evaporation by simply poking small holes into the bag using, for example, a pin. The gel is preferably of sufficient viscosity to prevent the gel from leaking directly from the bag through the pin hole. The pin hole simply increases the rate of evaporation by exposing more of the gel directly to air.

In this presently preferred embodiment, a plastic bag which will provide a typically rate of evaporation has a thickness of approximately one and a half mils. However, this is the storage/delivery bag in which evaporation is supposed to take place. Accordingly, these bags are preferably stored in an airtight container until use. In the preferred embodiment, another bag which is basically a sleeve-type of container can be used which is approximately 6 mils in thickness.

FIG. 1 is provided because before discussing the shape of the bags used to hold the gel, it is useful to first understand where in an engine the bags are disposed when in use. In very general terms, a combustion engine 20, among other things, requires a source of oxygen (in air) and a source of fuel (gasoline, diesel, liquid gases, etc.). The oxygen source is typically air which is pulled in through an air filter 22, and fed to an engine block 30 engine through an air intake hose 24. Sometimes, a compressor 26 or blower is also present in this air intake system. The fuel 28 is stored in a tank and fed to the engine block 30 via a fuel line 32. The oxygen fed to the engine block 30 is then burned with the fuel 28 in the engine.

As explained in the background, it is has been learned through experimentation that a combustion engine runs more efficiently when it has more oxygen to burn.

The present invention provides more oxygen to the engine by disposing the gel bag into the air intake system. The easiest place to do this is in the air filter 22. Unlike the prior art which requires a significant number of components to be added to an engine, the present invention does not change the structure the existing structure. The gel storage bag is simply placed inside the air filter 22 so that the oxygen which is released from the gel storage bag is pulled into the engine.

With this brief description, it is now possible to illustrate the gel bag.

Figure 2:
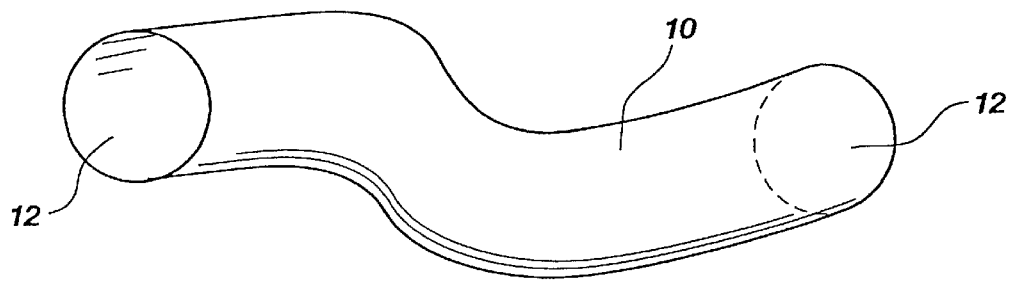
FIG. 2 is a tube-shaped plastic bag which stores the gel when the oxygenation system is being used in a combustion engine.

FIG. 2 is a perspective view of the presently preferred embodiment made in accordance with the principles of the present invention. The figure shows a flexible tube-shaped plastic bag 10. Although shown generally as a tube with rounded ends 12, this structure can be varied. The plastic bag 10 can be longer, shorter, wider, and even cut to fit very specific shapes of air filters. In other words, the exact shape of the bag is not critical to the invention. The important aspect of the shape of the plastic bag 10 are that it fit within the air filter 22. Advantageously, being shaped to fit inside the air filter 22 eliminates problems of having to change existing engine components, thus making the present invention very inexpensive to include in existing vehicles. Ideally, the plastic bag 10 will lie relatively flat on the bottom of the air filter, or against the sides as will be shown in another diagram.

Figure 3:
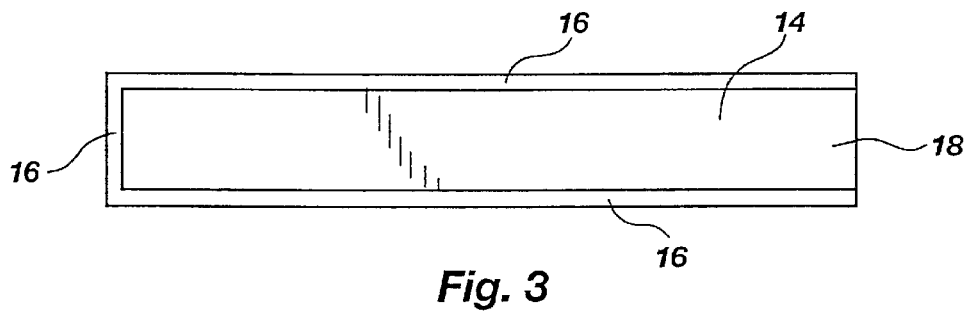
FIG. 3 is an alternative embodiment of a plastic bag used for storing the gel, which illustrates the concept that the shape of the bag is important only in that it allows placement of the bag into an air filter.

FIG. 3 is provided as an alternative embodiment of a plastic bag which can hold the gel. For purposes of illustrating alternative embodiments, figure,3 shows a rectangular-shaped bag 14. The bag 14 is formed by sealing the bag at three edges 16, leaving the last edge 18 open for receiving the gel. Once the gel is disposed within the bag 14, the last edge 18 is sealed. It is important to remember that the exact shape of the bag is only important insofar as it allows easy placement within the air filter 22 of an engine. Because air filters come in many shapes, and have openings in different places for the air-intake hose to leave the air filter 22 and be routed into the engine, the plastic bags are produced in several convenient shapes. Advantageously, the bags shown in FIGS. 2 and 3 can be adapted to fit in all air filters, and they have been illustrated for that reason. Therefore, it is within the scope of the invention to include plastic bags that are of many different shapes, including circular, square, and even bags that have portions which are perpendicular to each other so that the bag can rest both on a sidewall and a bottom of an air filter.

Figure 4:
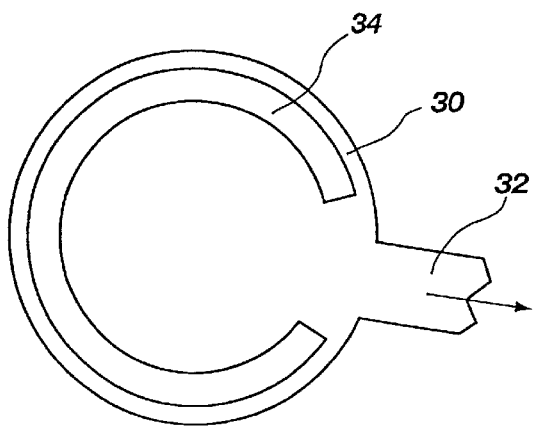
FIG. 4 is a top view of the tube-shaped bag of FIG. 2 inside of a circular air filter which has the top removed.
Figures 5A, 5B:
FIG. 5A is a top view of a disk-shaped plastic bag for storing gel.
FIG. 5B is a profile elevational view of the disk-shaped bag shown in FIG. 5A.

In to illustrate some of the concepts described above, the following figures are also provided. FIG. 4 is a top view of a circular air filter 30 with its top cover removed so that the contents can be observed. The air filter 30 has an air intake hose 32 which sends air to the engine. The plastic bag 34 filled with gel is disposed within the air filter 30. Advantageously, the plastic bag 34 does not block air flow into the air intake hose 32. Instead, the plastic bag is disposed so as to fit against the outer edges of the air filter 30. This is possible because the plastic bag is flexible and can be caused to conform to the interior of the air filter 30. Both the tube-shaped plastic bag 10 (FIG. 2) and the rectangular-shaped plastic bag 14 could fit into this air filter 30. However, it should be apparent that a generally circular bag 40 as shown in FIGS. 5A (top view) and 5B (edge view) can also be disposed within the circular air filter 30. The circular-shaped plastic bag 40 can also fit into air filters of other shapes, such as squares and rectangles. If the diameter of the circular plastic bag 40 is too large, edge of the circular plastic bag 40 can be folded over, or caused to lie against the sides of the air filter.

Figure 6:
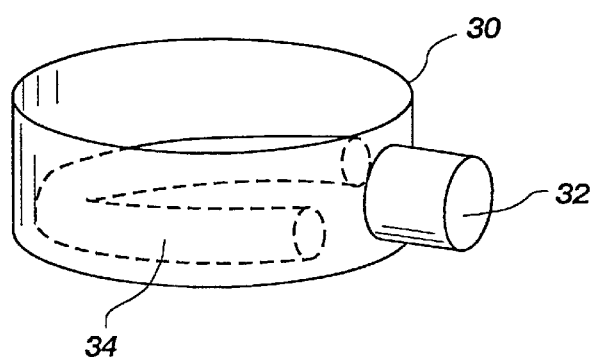
FIG. 6 is a perspective view of the air filter and tube-shaped plastic bag of FIG. 4 which shows how the plastic bag is disposed therein.

FIG. 6 is provided as a perspective view of the air filter 30 and the tube-shaped plastic bag 34 shown in FIG. 4. While this figure is useful for placing the objects into perspective relative to each other, it should be apparent that the size, including the dimensions and the volume of the plastic bag 34, can be varied greatly in order to conform to the space available within in an air filter, or the volume of the gel that the user wants to place into the engine.

Figure 7:
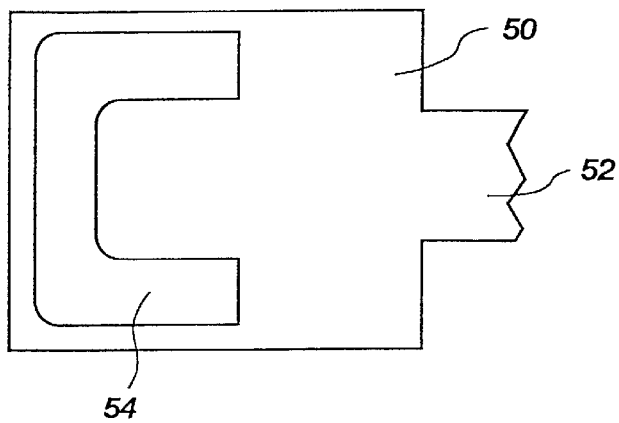
FIG. 7 is a top view of a generally rectangular air filter with a tube or rectangular shaped plastic bag which is caused to conform to the interior of the air filter.

Likewise, FIG. 7 is provided as another illustration of how a long plastic bag can be caused to fit into an air filter of different dimensions. FIG. 7 is a top view of an air filter 50 having a generally rectangular shape, a partial view of an air intake hose 52, and a plastic bag 54 filled with gel and disposed within the air filter.

Experimental use of the oxygenation system as described above has illustrated that the gel is able to supply oxygen to an engine, and improve engine performance. Early results show anywhere from a conservative increase of 5% in fuel efficiency up to even 20% and more. Furthermore, the engine exhibits improved power and performance.

The system works best at higher altitudes and in dryer climates. This is most likely to the fact that there is less oxygen in the air in both of these conditions. Dryer air does not contain as much moisture or oxygen in the air as does a wetter or colder climate. Therefore, there are modifications to the presently preferred embodiment which are important for its use in other than ideal climates.

In an alternative preferred embodiment, the present invention is adapted to function in a colder climate. A cold climate reduces the rate of evaporation of the gel, and therefore reduces the rate of oxygen delivery to an engine. Different components of an engine get warmer than others, especially depending upon placement of the air filter with respect to air flow outside the engine, and other warmer engine components. Therefore, some engines will be able to quickly warm the air filter with the gel inside, and maintain the temperature at an advantageous level of warmth. However, when the air filter remains relatively cold, a heating element is added to the system.

Figure 8:
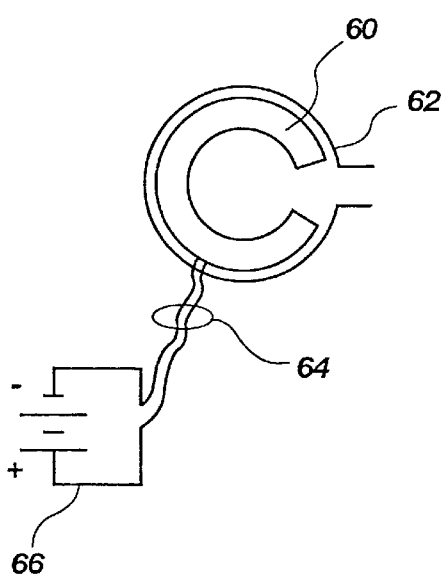
FIG. 8 is an alternative embodiment which illustrates the concept of using a heating pad in an air filter to maintain an evaporation rate of the gel at a desired level when operating in less than ideal evaporation conditions.

For example, FIG. 8 illustrates a top view of a pad 60 with heating elements disposed therein. The pad 60 is placed in the air filter and around or underneath a plastic bag (not shown). The pad 60 can be secured to the bottom of the air filter 62, or to the plastic bag itself, with a simple arrangement of bands. In FIG. 8, the pad 60 is coupled directly to the bottom of the air filter 62. The plastic bag would fit on top of the pad 60 as shown in FIGS. 4 or 6. The heating elements of the pad 60 would be energized, for example, by an electrical connection 64 which is coupled to the electrical system 66 of the engine. The pad 60 is only energized when the vehicle engine is running, to thereby prevent draining of a battery.

Figure 9:
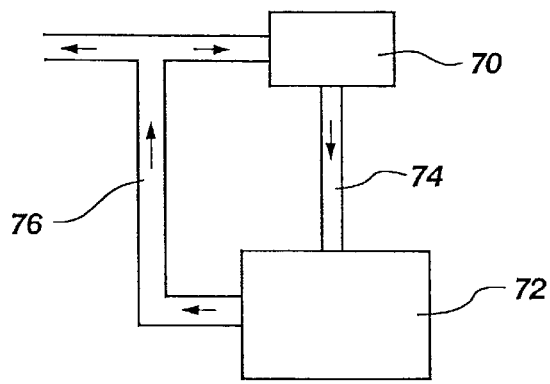
FIG. 9 is an alternative embodiment which shows how exhaust gases can be used to directly or indirectly heat the gel in the air filter.
Figure 10:
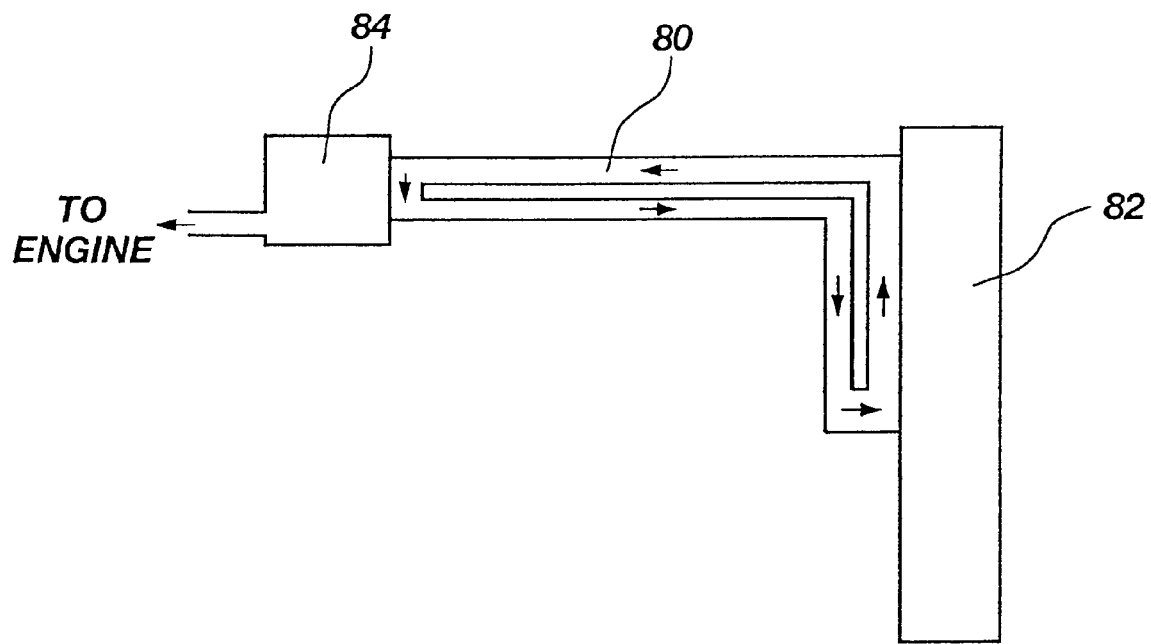
FIG. 10 is an alternative embodiment which shows how air that is heated by a radiator of an engine can be routed to warm the oxygenated gel in the air filter.

In another alternative embodiment, the gel in the plastic bag is heated by the routing of air flow as shown in FIG. 9. FIG. 9 is a diagram showing the air filter 70, the engine 72, the air intake hose 74, and the piping system 76 for exhaust gases. In this embodiment, exhaust gases are routed away from the engine in two different directions. The exhaust gases are normally vented, perhaps after being sent through a catalytic converter and muffler system. Either before or after the exhaust gases are so routed, some portion of the exhaust gases are routed back into the air filter 70. As the engine warms and the exhaust gases become warmer and warmer, the heat can be used to either directly warm the air flowing back into the engine, or the gases can be routed so as to pass out of the vehicle after passing by a container which is disposed against the air filter in order to conduct heat from the exhaust gases to the gel.

In another alternative embodiment, air 80 which is heated by a radiator 82 can also be routed to either pass directly into an air filter, or into a container adjacent to the air filter 84 which enables heat conduction to the air filter and the plastic bag within.

In another alternative embodiment, the material used in the preferred embodiment of the gel can be modified by adding other substances thereto. For example, it is possible for the gel made from PAM to freeze. It can be desirable to prevent freezing of the plastic bag and perhaps prevent rupture of the plastic bag, as well as to enable the continued evaporation of the gel. This will be desirable regardless of whether or not a method of heating is being used.

Preventing freezing of the gel can be accomplished, for example, by adding a substance which will lower the freezing point of the gel, much like antifreeze in water. It is possible that adding such an antifreeze component to the PAM will cause it to be a hazardous material. However, it will likely only be as hazardous as antifreeze in a radiator, and would have to be handled accordingly.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for supplying oxygen to a combustion engine to thereby improve performance thereof, and limit pollutants in gases emitted through an exhaust of the combustion engine, said system comprising:

an air intake system for receiving and filtering air from outside the combustion engine, wherein the air intake system delivers oxygen to the combustion engine;

a fuel tank for storing a fuel which is combusted within the combustion engine;

the combustion engine which combines air from the air intake system and the fuel from the fuel tank, wherein said combustion engine causes oxygen in the air to combust with the fuel, and wherein exhaust gases generated from the combustion are vented from the combustion engine; and an oxygen storage and delivery device which is disposed within a chamber of the air intake system, wherein said oxygen storage and delivery device stores an oxygenated gel, and wherein said oxygenated gel evaporates from the container thereby releasing oxygen into the air intake system.

2. The system for supplying oxygen as defined in claim 1 wherein the oxygen storage and delivery device for storing the oxygenated gel further comprises a gas permeable membrane material through which the oxygenated gel is able to evaporate.

3. The system for supplying oxygen as defined in claim 2 wherein the gas permeable membrane material is comprised of plastic forming a bag which is permeable to gases, thereby enabling a liquid within the oxygenated gel to evaporate through the porous material of the bag and thereby release oxygen which is stored in the oxygenated gel.

4. The system for supplying oxygen as defined in claim 3 wherein the plastic bag used in the oxygen storage and delivery device is punctured to thereby create at least one aperture therethrough to thereby increase a rate of evaporation of the oxygenated gel stored therein.

5. The system for supplying oxygen as defined in claim 4 wherein the chamber of the air intake system is an interior of an air filter system, wherein the air filter system comprises:

a housing which defines the chamber;

an air filter disposed within the housing so as to at least partially fill the chamber;

a cover to hold the air filter within the housing;

a hose coupled to the housing which is in fluid communication with the chamber and with the engine to thereby deliver air thereto; and the plastic bag which is disposed within the chamber without blocking the hose so as not to interrupt the fluid communication between the chamber and the engine.

6. The system for supplying oxygen as defined in claim 5 wherein the plastic bag is further comprised of plastic which is formed into a generally elongated and cylindrical shape which is capable of being curved to thereby conform to interior surfaces of the chamber.

7. The system for supplying oxygen as defined in claim 5 wherein the plastic bag is further comprised of plastic which is formed into a generally flattened disk shape which lies on a bottom surface of the chamber.

8. The system for supplying oxygen as defined in claim 5 wherein the plastic bag is further comprised of plastic which is formed into a generally elongated and rectangular shape which is capable of being curved to thereby conform to interior surfaces of the chamber.

9. The system for supplying oxygen as defined in claim 2 wherein the oxygenated gel further comprises a material which is combined with a liquid to thereby form the oxygenated gel.

10. The system for supplying oxygen as defined in claim 9 wherein the oxygenated gel is capable of being oxygenated such that evaporation of the oxygenated gel causes the oxygen stored therein to be released.

11. The system for supplying oxygen as defined in claim 10 wherein the material which is combined with liquid to form the oxygenated gel is further comprised of polyacrylamide.

12. The system for supplying oxygen as defined in claim 11 wherein the liquid which is combined with the polyacrylamide to form the oxygenated gel is further comprised of water.

13. The system for supplying oxygen as defined in claim 12 wherein at least one substance is added to the water to thereby lower a freezing point of the gel.

14. The system for supplying oxygen as defined in claim 13 wherein the at least one substance is an anti-freeze which does not inhibit evaporation of the gel.

15. The system for supplying oxygen as defined in claim 1 wherein the oxygen storage and delivery device further comprises a heating system which warms the oxygenated gel to thereby lower a freezing point of the gel.

16. The system for supplying oxygen as defined in claim 15 wherein the heating system further comprises an electrical heating element which is disposed adjacent to the oxygen storage and delivery device and inside the chamber of the air intake system, wherein the electrical heating element is powered using electricity from an electrical system of the combustion engine.

17. The system for supplying oxygen as defined in claim 16 wherein the heating system further comprises:

a heating chamber disposed adjacent to the chamber of the air intake system; and an exhaust hose which is in fluid communication with the heating chamber so as to channel at least a portion of the exhaust gases to the heating chamber to thereby transfer enable transfer of heat to the oxygen storage and delivery device.

18. The system for supplying oxygen as defined in claim 17 wherein the heating system further comprises:

a heating chamber disposed adjacent to the chamber of the air intake system;

a radiator air collection system for collecting at least a portion of the air which is warmed by a radiator of the combustion engine; and a transfer hose which is in fluid communication with the radiator air collection system so as to channel at least a portion of the air which is warmed by the radiator to the heating chamber to thereby enable transfer of heat to the oxygen storage and delivery device.

19. A method for improving performance of a combustion engine, and for reducing emissions therefrom by supplying oxygen to the combustion engine, said method comprising the steps of:

(1) providing an air intake system for receiving and filtering air from outside the combustion engine, a fuel tank for storing a fuel, and a combustion engine which combines air from the air intake system and the fuel from the fuel tank, and wherein exhaust gases generated from the combustion are vented from the combustion engine; and (2) providing oxygen to the combustion engine by disposing an oxygen storage and delivery device in the air intake system without modification thereto, wherein said oxygen storage and delivery device stores an oxygenated gel which releases oxygen into the air intake system.

20. The method as defined in claim 19 wherein the method further comprises the steps of:

(1) forming a gel;

(2) oxygenating the gel;

(3) forming the oxygen storage and delivery device from a gas permeable membrane which enables gases to pass therethrough, but prevents the passage of liquids;

(4) inserting the gel into the oxygen storage and delivery device and sealing the gel therein; and (5) enabling the oxygen within the gel to evaporate through the gas permeable membrane, thereby releasing oxygen into the air intake system.

21. The method as defined in claim 20 wherein the steps of forming and oxygenating the gel further comprises the steps of:

(1) placing polyacrylamide into a container;

(2) mixing water into the container with the polyacrylamide to form the gel; and (3) coupling a first end of an air hose to an oxygen tank, and a second end with a gas dispersion device into the gel for a period of time to cause oxygenation thereof.

22. The method as defined in claim 20 wherein the step of forming the oxygen storage and delivery device from a gas permeable membrane further comprises the step of selecting a plastic bag which is at least partially gas permeable which will enable a liquid within the oxygenated gel to evaporate through the gas permeable membrane of the plastic bag and thereby release oxygen which is stored in the oxygenated gel.

23. The method as defined in claim 22 wherein the step of enabling the gel to evaporate further comprises the step of puncturing the plastic bag to create at least one aperture therethrough to thereby increase a rate of evaporation of the oxygenated gel stored therein.

24. The method as defined in claim 22 wherein the step of placing the plastic bag into the air intake system further comprises the steps of:

(1) forming the plastic bag into a generally elongated shape which can be bent to conform to a shape of the air intake system; and (2) disposing the plastic bag inside a housing of an air filter so as to not interfere with an air filter unit and a hose which carries air from the air filter to the engine.

25. The method as defined in claim 22 wherein the step of placing the plastic bag into the air intake system further comprises the steps of:

(1) forming the plastic bag into a generally flattened disk-shape which conforms to a bottom surface of the air intake system; and (2) disposing the plastic bag inside a housing of an air filter so as to not interfere with an air filter unit and a hose which carries air from the air filter to the engine.

26. The method as defined in claim 20 wherein the step of forming the gel further comprises the step of adding a substance to the gel to thereby lower a freezing point thereof.

27. The method as defined in claim 26 wherein the step of forming the gel further comprises the step of adding an anti-freeze which does not inhibit evaporation of the gel.

28. The method as defined in claim 19 wherein the method further comprises the step of including a heating system to thereby warm the oxygenated gel.

29. The method as defined in claim 28 wherein the method further comprises the step of increasing a rate of evaporation of the oxygenated gel by heating.

30. The method as defined in claim 28 wherein the method further comprises the steps of:

(1) adding an electrical heating element adjacent to the oxygen storage and delivery device and inside the air intake system; and (2) powering the electrical heating element using electricity from an electrical system of the combustion engine.

31. The method as defined in claim 28 wherein the method further comprises the steps of:

(1) disposing a heating chamber adjacent to the air intake system;

(2) providing a warm fluid to the heating chamber to thereby warm the oxygen delivery and storage device disposed within the air intake system.

32. The method as defined in claim 31 wherein the method further comprises the step of directing at least a portion of exhaust gases from the combustion engine to the heating chamber to thereby warm the oxygen delivery and storage device.

33. The method as defined in claim 31 wherein the method further comprises the steps of:

(1) collecting air which is warmed by a radiator of the combustion engine; and (2) directing at least a portion of the warmed air to the heating chamber to thereby warm the oxygen delivery and storage device.

* * * * *